(12) United States Patent
Ryver et al.

(10) Patent No.: US 12,160,444 B2
(45) Date of Patent: Dec. 3, 2024

(54) QUANTUM COMPUTING MACHINE LEARNING FOR SECURITY THREATS

(71) Applicant: International Business Machines Corporation, Armonk, NY (US)

(72) Inventors: Kelly Nicole Ryver, Roswell, GA (US); Jennifer L. Szkatulski, Rochester, MI (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 17/647,090

(22) Filed: Jan. 5, 2022

(65) Prior Publication Data

US 2023/0216882 A1     Jul. 6, 2023

(51) Int. Cl.
*H04L 9/40*      (2022.01)
*G06N 3/04*      (2023.01)
(Continued)

(52) U.S. Cl.
CPC ........ *H04L 63/1441* (2013.01); *G06N 3/045* (2023.01); *G06N 10/80* (2022.01); *H04L 9/40* (2022.05)

(58) Field of Classification Search
CPC ............. H04L 63/1441; H04L 63/1416; H04L 63/1425; H04L 63/1433; H04L 9/0852; G06F 17/16; G06F 21/577; G06N 3/045; G06N 10/00; G06N 20/00; G06N 10/80; G06N 3/0475; G06N 10/60; G06N 3/08
See application file for complete search history.

(56) References Cited

U.S. PATENT DOCUMENTS 10,990,677 B2   4/2021   Wiebe
11,316,875 B2 *  4/2022   Frey ............... H04L 63/1458
(Continued)

FOREIGN PATENT DOCUMENTS

JP   2003-141538 A   5/2003
JP   2018-516419 A   6/2018
(Continued)

OTHER PUBLICATIONS

Attiah et al., "A Game Theoretic Approach to Model Cyber Attack and Defense Strategies", College of Engineering and Computer Science, University of Central Florida, FL USA, Accessed on Oct. 4, 2018, 978-1-4286-3180-5/18 2018 IEEE, 8 Pgs.
(Continued)

*Primary Examiner* — Vijay Shankar
(74) *Attorney, Agent, or Firm* — Peter J. Edwards

(57) ABSTRACT

Embodiments are disclosed for a method for a security model. The method includes generating a machine learning model that determines probabilities of a plurality of specific techniques, tactics, and procedures (TTPs) for a security domain. The method also includes generating a machine learning model that maps multiple TTPs to a polytope for the security domain. Additionally, the method includes generating a polytope visualization having multiple visualized points in a multi-dimensional space. The visualized points represent corresponding TTPs of a same type and associated probabilities. Further, a disposition of each of the visualized points is based on the determined probabilities and the mapped plurality of TTPs.

20 Claims, 9 Drawing Sheets

(51) Int. Cl.
  *G06N 3/045*  (2023.01)
  *G06N 10/80*  (2022.01)

(56) References Cited

U.S. PATENT DOCUMENTS

| | | | |
|---|---|---|---|
| 11,580,195 B1* | 2/2023 | Batruni | G06F 17/16 |
| 11,843,616 B2* | 12/2023 | Frey | H04L 63/1466 |
| 2018/0097826 A1 | 4/2018 | Luan | |
| 2018/0349605 A1 | 12/2018 | Wiebe | |
| 2018/0367561 A1 | 12/2018 | Givental | |
| 2019/0149564 A1 | 5/2019 | McLean | |
| 2019/0208412 A1 | 7/2019 | Lord | |
| 2019/0260804 A1 | 8/2019 | Michael | |
| 2020/0036743 A1 | 1/2020 | Almukaynizi | |
| 2021/0234882 A1* | 7/2021 | Lee | G06T 15/005 |
| 2021/0281583 A1 | 9/2021 | Okunlola | |
| 2022/0019674 A1* | 1/2022 | Frey | H04L 63/1458 |
| 2023/0370439 A1* | 11/2023 | Crabtree | H04L 63/0428 |

FOREIGN PATENT DOCUMENTS

| | | |
|---|---|---|
| JP | 2017-059074 A | 10/2018 |
| WO | 2017223294 A1 | 12/2017 |
| WO | 2019/142345 A1 | 7/2019 |

OTHER PUBLICATIONS

AU202111391872.1, Examination report No. 1 for standard patent application, mailed Oct. 3, 2023, Australian Government, IP Australia, 4pgs.

Patent Cooperation Treaty PCT Notification of Transmittal of the International Search Report and the Written Opinion of the International Searching Authority, or the Declaration, International Application No. PCT/EP2021/059812, International filing date Apr. 15, 2021, Date of Mailing Jul. 21, 2021, 13 Pgs.

PCT/EP2021/059812—International Preliminary Report on Patentability, issued Nov. 8, 2022 (8 pgs).

Rugers., "Risk Management and the Quantum Threat", A Thesis submitted in partial fulfillment for the degree of Master of Science at the Cyber Security Academy, Jan. 2018, 83 Pgs.

Wiebe, Nathan & Kumar, Ram. (2018). Hardening Quantum Machine Learning Against Adversaries. New Journal of Physics. 20. 10.1088/1367-2630/aae71a, Year 2018.

Arslan et al., "A study on the use of quantum computers, risk assessment and security problems", Conference Paper—Mar. 2018, 7 pages.

IBM Appendix P., "List of IBM Patents or Patent Applications to be Treated as Related", Dated Herewith, 2 pages, May 2020.

Kelly N. Ryver, "Quantum Computing Machine Learning for Security Threats", U.S. Appl. No. 16/867,586, filed May 6, 2020, 50 Pgs.

Lloyd, Seth, et al., "Quantum embeddings for machine learning," arXiv preprint arXiv:2001.03622v2, Feb. 10, 2020, 11 pages.

Mell et al., "The NIST Definition of Cloud Computing", Recommendations of the National Institute of Standards and Technology, Sep. 2011, 7 pages.

Ryver, "Quantum Computing Machine Learning for Security Threats," U.S. Appl. No. 18/097,576, filed Jan. 17, 2023.

Updated List of IBM Patents or Patent Applications Treated as Related, Dated Jan. 12, 2023, 2 pages.

Japan Patent Office, "Notice of Reasons for Refusal," Aug. 27, 2024, 6 Pages. JP Application No. 2022-565741.

Kazato et al. "A study on Maliciousness Measurement in Cyber Threat Intelligence Using Graph Convolutional Networks", IEICE Technical Report, Information Networks, Japan, general incorporated foundation Institute of Electronics, Information and Communication Engineers, Feb. 25, 2019, pp. 265-270 (11 pages), vol. 118, No. 466.

* cited by examiner

US 12,160,444 B2

QUANTUM COMPUTING MACHINE LEARNING FOR SECURITY THREATS

BACKGROUND

The present disclosure relates to security threats, and more specifically, to quantum computing machine learning for security threats.

Conventional computing is useful for identifying potential security threats using models that can break the problem of identifying security threats down to a manageable level of complexity. However, conventional approaches can rely on assumptions about how malicious actors, such as hackers and malware, have behaved in the past. Thus, conventional approaches may not be suited for identifying security threats with new or unseen behaviors.

SUMMARY

Embodiments are disclosed for a method for a security model. The method includes generating a machine learning model that determines probabilities of a plurality of specific techniques, tactics, and procedures (TTPs) for a security domain. The method also includes generating a machine learning model that maps multiple TTPs to a polytope for the security domain. Additionally, the method includes generating a polytope visualization having multiple visualized points in a multi-dimensional space. The visualized points represent corresponding TTPs of a same type and associated probabilities. Further, a disposition of each of the visualized points is based on the determined probabilities and the mapped plurality of TTPs.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
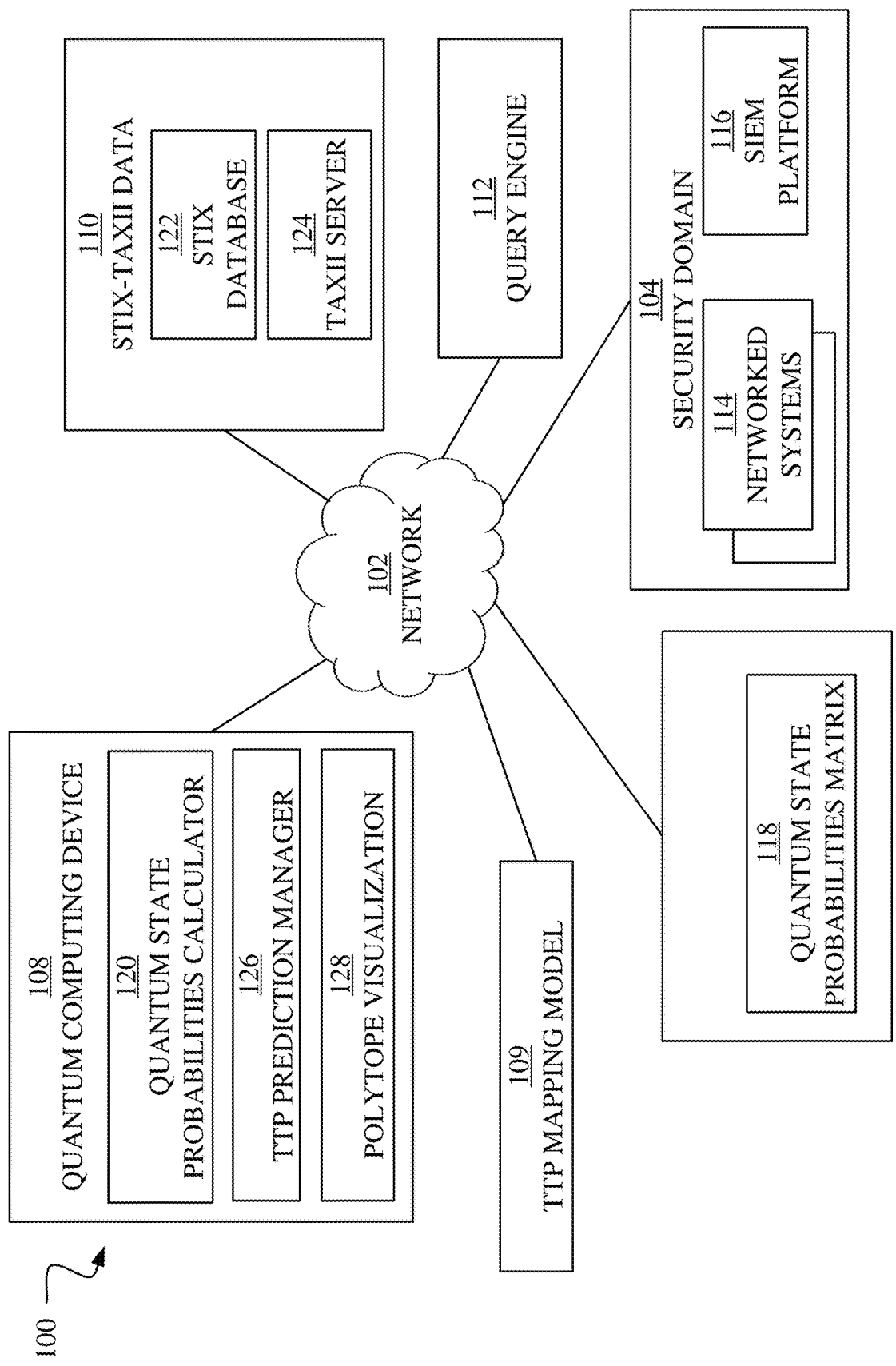
FIG. 1 is a block diagram of an example system for a quantum computing based machine learning model, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

The increasing sophistication of computing technology creates a race between those developing security threats and those attempting to stop security threats. Thus, without new approaches to identify security threats, emerging technologies, such as artificial intelligence; game theory; and the like, may have the potential to raise the complexity of identifying security threats beyond the solution power of conventional computers.

Machine learning is a useful way to identify potential security threats for computer systems and networks. Machine learning models can be computer coded algorithms configured to learn how to perform specific classifications. A classification can be a determination that the machine learning models make to label a specific state. For example, in the field of computer security, a classification can involve analyzing the state of a computer system, determining whether the system is under threat of attack, and labeling the computer state accordingly. Thus, an example machine learning model for security threats can perform classifications of computer systems as either safe or threatened.

Many machine learning models rely on particular frameworks for analyzing potential security threats. Three example industry frameworks include the Diamond Model of Intrusion Analysis, and Lockheed Martin Cyber Kill Chain®. In concert with the Structured Threat Information expression-Trusted Automated exchange of Indicator Information (STIX-TAXII) standards, these frameworks are useful tools for determining how a malicious actor or adversary may attack. Interestingly, these frameworks are based upon kinetic warfare models, such as, those used on the physical battlefield. Accordingly, these traditional frameworks are referred to herein as linear (and kinetic) because on the physical battlefield, a soldier or group of soldiers may move, or launch weapons that move, in straight lines from one geographic position to another.

The Diamond framework states that everyone (person, company or group) is a victim or adversary. Adversaries can become victims, and victims can become adversaries. This philosophy is loosely based upon Sun Tzu's The Art of War. The typical (kinetic/symmetric) attack will show an adversary utilizing their capability to exploit some kind of infrastructure to get to a victim. The Diamond framework can use a stochastic model for determining (to an extent) the probability of an adversary gaining access to the victim via a particular path of attack.

The Lockheed Martin Cyber Kill Chain® specifies a sequence of attack methods, also referred to herein as, techniques, tactics, and procedures (TTPs). The TTPs include reconnaissance, weaponization, delivery, exploitation, installation, command and control (C&C), and actions on objectives. Reconnaissance refers to a malicious actor's surveillance of a potential target for attack. Weaponization can involve the use of a target system's tools to facilitate the attack. For example, a malicious actor or malware can acquire a system credential that provides login access to a computer system, and weaponize the credential by using it to break into the computer system for a malicious purpose. Delivery and exploitation can involve the initial access to the target system. Installation refers to copying an executable version of malware on to the target system. The term, "command and control," refers to a state where the malicious actor and/or malware have complete control of the target system. The TTP, "actions on objectives," can involve the actions taken once the bad actor has access, such as, stealing or exfiltrating data. Within security domains of potential target systems, such data can include state secrets, trade secrets, bank and credit card accounts, person emails and pictures, and the like.

The Lockheed Martin Cyber Kill Chain® includes a subset of the TTPs of the MITRE ATT&CK framework. Further, the MITRE ATT&CK framework places TTPs in a different order, i.e., sequence. The MITRE ATT&CK framework can be described as kinetic with respect to its perspective on attack strategy. The EXAMPLE MITRE ATT&CK FRAMEWORK below includes a table of TTPs arranged in categories. These categories and TTPs are merely a subset of the MITRE ATT&CK framework, which currently includes 433 attack techniques and sub-techniques, but continues to grow.

intelligent adversary, such as a generative adversarial network (MalGAN); quantum-computing attack strategies, and the like. Further, the frameworks may be limited by classical computing methods.

Classical computing provides benefits to organizations and individuals around the world. However, there are challenges that conventional systems cannot solve within reasonable time frames. More specifically, for problems above a certain size and complexity, there is a lack of computational power using traditional binary computer processors (e.g., computing methods that use bits of values of 0 or 1) to tackle them.

For example, conventional frameworks represent and categorize in two dimensions. Additionally, it is possible to generate heat maps to describe potential threats. The heat map can be a two-dimensional (2D) table that indicate the likelihood of a threat with a color, the "heat" of the threat. In the English language, a heat map reads from left to right; in Japanese, from right to left and top to bottom, for example. However, developing heat maps in a third dimension, e.g., time, may not be practically obtainable in a timely manner using conventional computing. For example, it may be challenging to produce a three-dimensional (3D) model in classical space that can fluctuate according to time quickly and efficiently enough to be useful in the same way a model in a Hilbert space can. In mathematics, Hilbert spaces can be infinite-dimensional function spaces. Further, it may also be challenging to produce a 3D heat map visually that a viewer can practically comprehend. Such a heat map may involve representation in a tesseract-like arrangement that may be visually confusing to the viewer. In these ways,

| Initial Access (A) | Execution(B) | Persistence(C) | Privilege Escalation(D) | Defense Evasion(E) | Credential Access(F) |
|---|---|---|---|---|---|
| Drive-by compromise | AppleScript | .bash_profile and .bashrc | Access token manipulation | Access token manipulation | Account manipulation |
| Exploit public-facing app | CMSTP | Accessibility features | Accessibility features | Binary padding | Bash history |

Example Mitre ATT&CK Framework

The assumption in these types of frameworks is that a malicious actor starts with Initial Access (A). Once access to the environment is gained, the actor can begin Execution (B) of some kind of malware (i.e., bot, virus, worm, trojan). From there, the actor can move to Persistence (C), and so on through the entire framework. Another assumption in such frameworks is that the adversary will start with some kind of exploit and progress down the attack chain in a linear, or kinetic, fashion. Thus, if the malicious actor is not successful with the first Initial Access TTP, the drive-by compromise, this actor may move down the Initial Access column, and next attempt to exploit a public-facing application (app). However, if drive-by compromise is successful, the malicious actor may move to the next column in the MITRE ATT&CK framework by performing a TTP in the Execution category. Thus, the frameworks may be useful for identifying the likelihood of a specific initial TTP, and subsequent TTPs. However, while the frameworks are useful, they may be based on traditional ideas of a physical battlefield. As such, the frameworks may not take into consideration more modern types of attacks on the cyber battlefield. For example, the frameworks do not address attacks that use game theory (with three or more players), an artificially it can be challenging to use classical computing for presenting a useful, understandable visual representation of the likelihood of specific cyber security threats.

One approach for attempting to solve some of these problems involves a relatively new kind of computing: universal quantum computing. Universal quantum computers can leverage the quantum mechanical phenomena of superposition and entanglement to create states that scale exponentially with the number of qubits, also referred to herein as quantum mechanical system and quantum bits.

Accordingly, embodiments of the present disclosure provide a quantum computing based machine learning model for identifying the likelihood of specific potential security threats. Further, using this model, some embodiments of the present disclosure may generate a three-dimensional visual representation of the threats. In this visual representation, the illumination of a specific position in 3D space may indicate the specific threat, and a determined likelihood of the threat. A quantum computing system may thus generate: machine learning models that determine the probabilities of specific potential TTPs; and, 3D vector space representations of the potential TTPs and their corresponding probabilities.

For example, the quantum computing based machine learning model can determine the probabilities of a malicious actor committing specific types of Initial Access TTPs, such as drive-by compromise and spearphishing links. Similarly, this model can determine the probabilities that a malicious actor will move from the specific Initial Access (and subsequent TTPs) to the next of Execution, Persistence, and further subsequent TTPs. In this way, some embodiments of the present disclosure can improve the effectiveness of computer security systems. By improving the ability to predict an initial access TTP with a Bloch sphere visual representation, for example, it may be possible to more effectively pre-empt and mitigate initial access TTPs. Further, by pre-empting Initial Access TTPs, some embodiments of the present disclosure may create a positive feedback effect in reducing the number of TTPs that security systems may further identify and mitigate.

FIG. 1 is a block diagram of an example system 100 for a quantum computing based machine learning model for security threats, in accordance with some embodiments of the present disclosure. The system 100 includes a network 102, a security domain 104, a security threat model 106, a TTP mapping model 109, a quantum computing device 108, a trusted automated exchange of information, such as a structured threat information expression-trusted automated exchange of indicator information (STIX-TAXII) data 110, and query engine 112.

Network 102 may include one or more computer communication networks. An example network 102 can include the Internet, a local area network (LAN), a wide area network (WAN), a wireless network such as a wireless LAN (WLAN), or the like. Network 102 may comprise copper transmission cables, optical transmission fibers, wireless transmission, routers, firewalls, switches, gateway computers and/or edge servers. A network adapter card or network interface in each computing/processing device implemented as part of the security domain 104, security threat model 106, TTP mapping model 109, quantum computing device 108, STIX-TAXII data 110, and query engine 112, for example, may receive messages and/or instructions from and/or through network 102, and forward the messages and/or instructions for storage or execution (or the like) to a respective memory or processor of the respective computing/processing device. Though network 102 is depicted as a single entity in FIG. 1 for purposes of illustration, in other examples, network 102 may include a plurality of private and/or public networks over which the components of the system 100 may communicate.

The security domain 104 can be a computer hardware and software architecture for which the security threat model 106 can identify potential security threats. This computer hardware and software architecture can include personal computing devices, mobile computing devices, desktop and laptop computers, virtual appliances, containers, or any other cloud component. The security domain 104 can include networked systems 114 and a security information and event management platform (SIEM platform 116). The networked systems 114 can be one or more computer systems connected to one or more computer communication networks. For example, the networked systems 114 can include a server farm. Alternatively, or additionally, the networked systems 114 can include any number of computer and network nodes as well as associated hardware and software combinations. The SIEM platform 116 can refer to software tools and/or services that combine the management of security information and malicious attacks.

Machine learning models can make classifications based on certain features of a state. For example, a machine learning model can classify a digital picture as either containing a human or animal subject based on the features of the digital picture. The features of the digital picture can include the colors of each pixel and the composition of the pixels in relation to each other. Using these features, a machine learning model can calculate a probability that the digital photograph contains a human or an animal subject. Accordingly, a machine learning model can label the digital photograph with the class having the higher probability.

In some embodiments of the present disclosure, the security threat model 106 can be a machine learning model that is trained to identify a potential Initial Access TTP, and subsequent attacks by analyzing the features of the networked systems 114 and determining the probabilities of one or more potential attack methods (e.g., TTPs). Such an analysis may be based on the features of the security domain 104 and networked systems 114. For example, the security threat model 106 can be trained to determine these probabilities by using STIX-TAXII data 110. The STIX-TAXII data 110 can include a STIX database 122 and a TAXII server 124. The term, STIX, refers to a standardized language for describing information about security threats. In this way, STIX can describe the motivations, abilities, capabilities, and responses for a security threat. STIX can be shared via TAXII or other similar tools. Further, the STIX database 122 can include a number of STIX files that describe various security threats. In some embodiments, the data from the STIX-TAXII data 110 can be pre-loaded into a SIEM engine or machine learning platform and used as threat intelligence data. With artificial intelligence and machine learning, this can be used as training data. However, without artificial intelligence and machine learning, this can be used as a data set that a rules engine can build upon. Accordingly, when there is an attack by a malicious actor, the data from that actor or hack is compared to the pre-loaded rule set. In terms of quantum state probabilities, the data from the STIX-TAXII data 110 can be used to set the initial vector-positions within a Bloch sphere or serve as a data set against which the quantum model, or quantum device, can be tested.

The TAXII server 124 can be a tool that defines how information about security threats can be shared via online services and message exchanges. The TAXII server 124 can provide access to the STIX database 122 by providing a RESTful API service (not shown), that is compatible with common sharing models. For example, the TAXII server 124 can define four services, which can be selected, implemented, and combined into different sharing models.

Accordingly, the security threat model 106 can generate a quantum state probabilities (QSP) matrix 118 that represents the probabilities of a specific Initial Access TTP (and TTP types) that a malicious attacker may perform, by using the STIX-TAXII data 110 as a source. In some embodiments, the security threat model 106 can generate the QSP matrix 118 to include one probability for each potential TTP as arranged in the MITRE ATT&CK framework. The EXAMPLE QSP MATRIX 1 below is one example of the QSP matrix 118:

|   | A | B | C | D | E |
|---|---|---|---|---|---|
| 1 | (x, y, z) | $(xb_1, yb_1, zb_1)$ | (x, y, z) | (x, y, z) | (x, y, z) |
| 2 | (x, y, z) | (X, Y, Z) | $(xc_2, yc_2, zc_2)$ | (x, y, z) | (x, y, z) |
| 3 | (x, y, z) | (x, y, z) | (X, Y, Z) | $(xd_3, yd_3, zd_3)$ | (x, y, z) |
| 4 | $(xa_4, ya_4, za_4)$ | (x, y, z) | (x, y, z) | (X, Y, Z) | $(xe_4, ye_4, ze_4)$ |
| 5 | (x, y, z) | (x, y, z) | (x, y, z) | (x, y, z) | (X, Y, Z) |

Example QSP Matrix 1

In this example, the row and column headings A through E and 1-5 can represent specific states (e.g., categories of TTP). Thus, A can represent Initial Access, B can represent Persistence, C can represent Execution, D can represent Discovery, and E can represent Collection. In this example, the states are represented in vector-space notation with a malicious actor's starting point in an attack indicated with a specific value, e.g., $(xa_4, ya_4, za_4)$, as opposed to the generic, $(x, y, z)$. Further, the row headings of EXAMPLE MATRIX 1 can represent a current state of a malicious actor, and the column headings can represent an inferred state of the malicious actor. The inferred state can represent the state that the security threat model 106 is going to potentially infer for example: $(xb_1, yb_1, zb_1)$ is the next act of the malicious actor given the initial state.

Accordingly, each cell of EXAMPLE QSP MATRIX 1 can represent the calculated probability that the malicious actor proceeds from a specific (current) category of TTP to another category of TTP. In some embodiments of the present disclosure, the probability can be represented as an array of binary values: 0 and 1. The array of binary values can include one value for each potential TTP in a category. The QSP calculator 120 can set the binary value to 0 if the specific TTP is unlikely, and set the value to 1 if the specific TTP is likely. Thus, the binary value can be set to 1 to indicate that the specific TTP is more likely than not. Accordingly, the QSP calculator 120 can use the individual likelihood determinations of each TTP of a category to determine an aggregate likelihood that the malicious actor will commit the category of TTP.

The EXAMPLE QSP MATRIX 2 below is an example of QSP matrix 118.

|   | A | B | C | D | E |
|---|---|---|---|---|---|
| 1 | <???> | <111> | <000> | <000> | <000> |
| 2 | <000> | <???> | <111> | <000> | <000> |
| 3 | <000> | <000> | <???> | <111> | <000> |
| 4 | <111> | <000> | <000> | <???> | <111> |
| 5 | <000> | <000> | <000> | <000> | <???> |

Example QSP Matrix 2

In the EXAMPLE QSP MATRIX 2, the array of binary values includes 3 values to represent the probability of an TTP in a quantum state. The "???" can represent a quantum position that is unknown as the malicious actor may choose to take no further action once this point in the attack is reached; also unknown is whether the states behind the unknown will stay the same. Further, the "<111>" means that the probability of moving from A to B is almost certain. In column A in particular, "<111>" is used to indicate that a malicious actor will start with Initial Access using something like a drive-by compromise; therefore, column A, row D indicates "<111>" which means this particular TTP is certain, and based upon the results the malicious actor will continue the attack.

However, the array can include more or fewer values. In some embodiments of the present disclosure, the number of values can be increased to 12, to cover the lateral area of the MITRE ATT&CK® framework, and to overlay those lateral areas onto a Bloch sphere (with vectors). In some embodiments using quantum states, the number of values may be two or four. By representing the likelihoods of a malicious actor's potential actions, it can be possible to identify a pattern that enables the security domain 104 to determine response capability, target security controls to specific areas, and improve cryptographic methods accordingly.

Additionally, the QSP calculator 120 can consider these individual likelihoods in the aggregate to determine the likelihood of a specific category of TTP. Thus, where half of the individual TTPs are likely, and considered in the aggregate, the corresponding category of TTP may also be likely. In this way, the QSP matrix 118 can represent the likelihood that a malicious actor will move from one category of TTP to another. Additionally, if a malicious actor moves to a specific category of TTP, the QSP matrix 118 can represent the likelihood that the malicious actor uses any one of the TTPs within the category.

It is noted that the cells representing the probability that the malicious actor will avoid a specific TTP from the same category is, "<000>." For instance, in EXAMPLE QSP MATRIX 2, column A row E displays "<000>" which indicates that while the malicious actor wants to gain initial access to some system, the actor is not likely to do so by exploiting a public-facing application.

Generating the QSP matrix 118 can involve the use of a quantum computing device, such as the quantum computing device 108. The quantum computing device 108 can be generally described in comparison with conventional computing devices, which rely on the ability to store and manipulate information in individual bits. Bits are computer storage units that store information as binary 0 and 1 states. In contrast to conventional computing devices, the quantum computing device 108 leverages quantum mechanical properties to store and manipulate information. More specifically, the quantum computing device 108 uses the quantum mechanical properties of superposition, entanglement, and interference to manipulate the state of a qubit. Superposition refers to a combination of states (described independently in conventional devices). The idea of superposition can be analogized to the field of music, where playing two musical notes at once creates a superposition of the two notes. Entanglement is a counter-intuitive quantum phenomenon describing behavior otherwise unseen in the physical universe. Entanglement refers to the phenomena of independent particles behaving together as a system.

In some embodiments of the present disclosure, the quantum computing device 108 can include a QSP calculator 120, TTP prediction manager 126, and a polytope visualization 128. Further, the QSP calculator 120 can use quantum computing to calculate multiple probabilities of multiple potential security threats as a problem of linear complexity. The QSP calculator 120 can include vector equations, linear algebra tables, and other relevant mathematics to calculate each probability in the QSP matrix 118. This can include the probability that a malicious actor will commit each of numerous potential categories of TTP. This probability can be based on the most recent category of TTP. Additionally, the QSP calculator 120 can include such mathematics to determine the probability that the malicious actor will commit each of numerous potential TTPs in a specified category of TTP. In this way, the QSP calculator 120 can generate the QSP matrix 118.

In some embodiments of the present disclosure, the QSP calculator 120 can generate, for each of the types (e.g., Initial Access, Execution) of TTP, a quantum state probability matrix 118 based on historical data from the SIEM platform 116, and mobile cyber ranges to look at how malicious actors executed their attacks in the past. Mobile cyber ranges refer to simulations of a security domain that are connected to a simulated Internet environment. Mobile cyber ranges can provide a safe, legal environment for security testing. Generating the QSP matrix 118 in this way, the initial quantum state probability matrix 118 can include a table of probabilities that are based upon past events but could be used to determine the probability that a malicious actor will commit specific categories of TTP and the specific TTP.

The TTP prediction manager 126 can generate a polytope visualization 128, which can represent the likely TTPs of a specific type (e.g., Initial Access), and the respective probabilities of each specific TTP (such as, spearphishing attachments, and hardware additions) on the security domain 104. A polytope refers to a multi-dimensional, geometric object. Accordingly, the polytope visualization 128 can be a polyhedron, 3D heat map, a sphere (e.g., a Bloch sphere), and the like. Additionally, the TTP prediction manager 126 can generate further polytope visualizations 128 to represent the probabilities of specific, and further subsequent attacks. Thus, the TTP prediction manager 126 can generate a Bloch sphere visualization, for example, that includes a visualized point in 3D space for each likely TTP in initial access type TTPs. The TTP prediction manager 126 can determine the likely TTPs as those exceeding a threshold probability. Accordingly, the polytope visualization 128 may include a visualized point for each of the likely TTPs. Further, the disposition in 3D space can indicate the specific TTPs that are likely, and the associated probability.

According to some embodiments of the present disclosure, the TTP prediction manager 126 can use TTP mappings from the TTP mapping model 109 to generate the polytope visualization 128. More specifically, the TTP mapping model 109 can be a machine learning model that is trained to learn how to map specific TTPs of same type to a polytope in multidimensional space. The TTPs may include known TTPs, such as those in the MITRE ATT&CK framework. Additionally, the TTPs may include unknown and evolving newer TTPs, including game theory, MalGAN, and quantum computing based TTPs. Further, the TTP mapping model 109 may learn to further refine and/or expand TTP mappings into other categories, such as specific industries that are targets of TTPs, or specific organizations that perpetrate TTPs. The TTP mapping model 109 can be configured to learn these further refinements, and identify new ways to refine and/or expand the mappings. The mappings may thus provide a vector that is unique to each specific TTP of the type. In this way, the TTP prediction manager 126 can use the TTP-polytope mapping model 109 to determine a vector-space that represents each of specific TTPs for a category of TTP (e.g., Initial Access, Execution, Command and Control).

Accordingly, the TTP prediction manager 126 can determine a coordinate in three-dimensional space representing the probability of the TTP by generating a ray starting at the origin of a Bloch sphere, and travelling in the determined vector-space for a distance equal to the probability of the attack. Thus, since probability can range from zero (0% confidence) to one (100% confidence), there are three possibilities for attack representation, at the origin, within the Bloch sphere, and on the surface of the Bloch sphere. Points at the origin represent no confidence in the specific TTP as there is no historical data on which to base the malicious actor's first move along the attack surface, and as such, may not be included in the polytope visualization 128. A point on the surface of a 1-unit Bloch sphere may represent a TTP that the security threat model 106 has 100% confidence is likely. Accordingly, points between the surface and the origin of the Bloch sphere may represent TTPs with confidence probabilities between zero and one hundred percent.

The query engine 112 can represent a computer hardware and/or software architecture that can query the security threat model 106 to identify the likelihood of a potential TTP. In this way, embodiments can make it possible to predict or infer future TTPs. Querying the security threat model 106 can identify the likelihood that an attack: 1) is coming from a known malicious actor because it fits a pattern; 2) fits a pattern based upon similar attacks in the past; and/or 3) will follow.

The TTP prediction manager 126 may generate the polytope visualization 128 based on the security threat model 106. In some embodiments of the present disclosure, the polytope visualization 128 can show (in the visual context of a polytope, such as, a Bloch sphere) the likelihood of a subset of potential TTPs. More specifically, each potential TTP can appear as a point in 3D space. The location of the point can thus indicate a specific TTP and the likelihood of the specific TTP. The Bloch sphere visualization is described in greater detail with respect to FIGS. 2-5.

Figure 2:
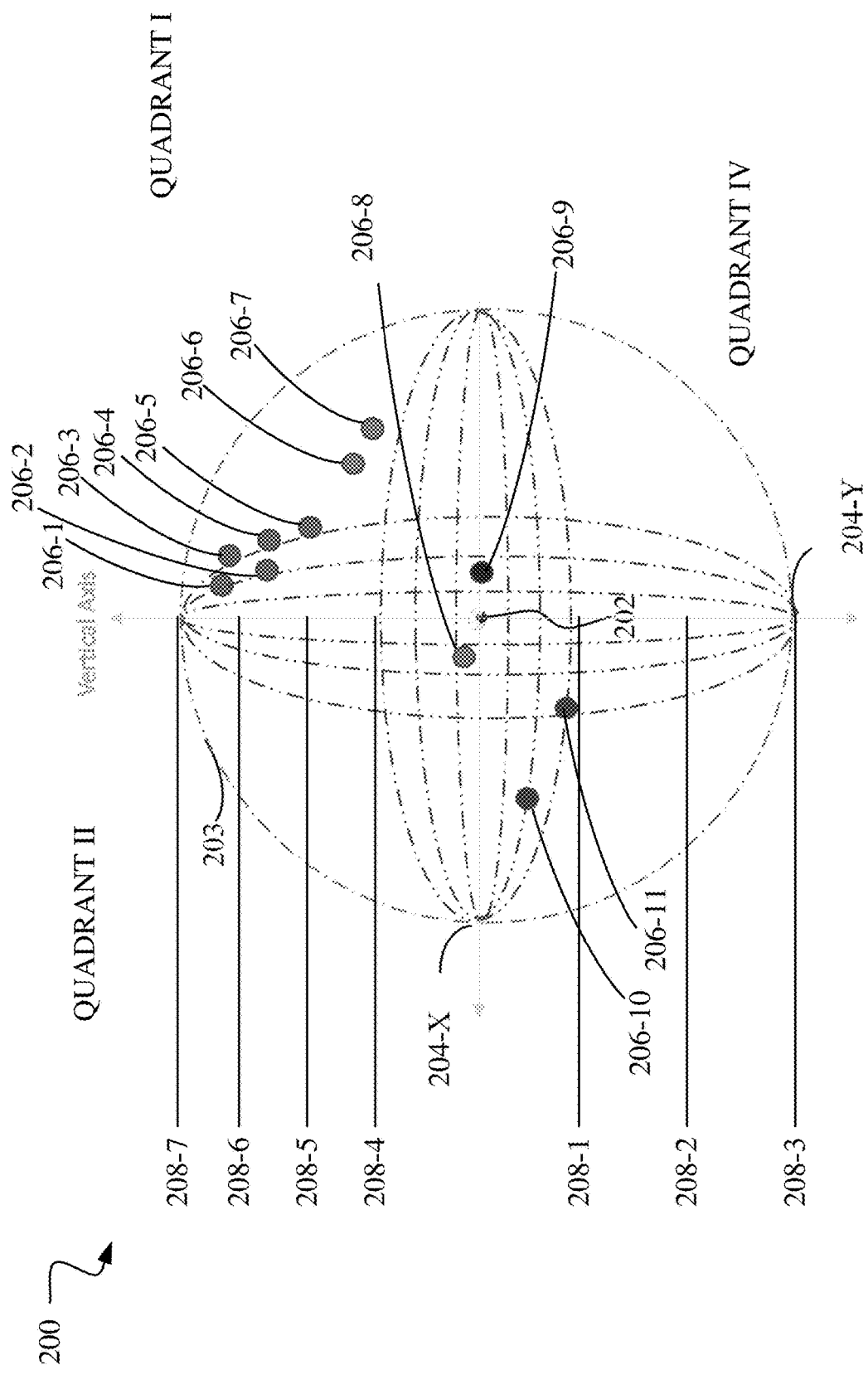
FIG. 2 is a diagram of an example Bloch sphere mapping for an initial access technique, tactic, or procedure (TTP), in accordance with some embodiments of the present disclosure.

FIG. 2 is a diagram of an example Bloch sphere mapping 200 for an initial access TTP, in accordance with some embodiments of the present disclosure. In quantum mechanics, the Bloch sphere is a geometrical representation of the pure state space of a two-level qubit. In this example, Bloch sphere mapping 200 can represent a subset of potential TTPs that one or more malicious actors can commit. The Bloch sphere mapping 200 can represent each TTP as a point (e.g., TTP points 206-1 through 206-11, collectively TTP points 206) in three-dimensional space on a surface 203 of the Bloch sphere. Additionally, the example Bloch sphere mapping 200 includes an origin 202, at the center of the Bloch sphere mapping 200. Accordingly, each point 206 can indicate a vector from the origin to the point 206. In this way, each specific TTP of the subset can be associated with a vector to the corresponding TTP point 206.

More specifically, the example Bloch sphere mapping 200 includes axes 204-X, 204-Y (collectively, axes 204). The axes 204 are represented with circles resulting from the intersection of planes with the Boch sphere at the x-axis and y-axis. In this way, the axes 204 divide the Bloch sphere into four quadrants: one with positive x and y space (e.g., quadrant I), one with negative x and negative y space (e.g., quadrant II), one with negative x and y space (e.g., quadrant III), and one with positive x and negative y space (e.g., quadrant IV). In this way, quadrant I can map TTPs in upper levels of the application stack and the end of the network stack. Similarly, quadrants II, III, and IV can respectively map: TTPs in upper levels of the application stack and the end of the network stack; in lower levels of the application stack and the beginning of the network stack; and, in upper levels of the application stack and the beginning of the network stack. While the example Bloch sphere mapping 200 occupies a three-dimensional space, embodiments of the present disclosure can use Bloch spheres of three or more dimensions. Additionally, the axis 204-$y$ can divide the TTP mappings into network and application TTPs. Thus, network TTPs may map to the quadrants in negative x-space, and application TTPs may map to quadrants in the positive x-space.

According to some embodiments of the present disclosure, the disposition of a particular point 206 in the y-space of the Bloch sphere mapping 200 can be based on a relationship between the TTP and a layer of the open systems interconnection (OSI) model. For example, layers one through three of the OSI model may be associated with the negative y-space. Thus, the Bloch sphere mapping 200 may map TTPs associated with layer one of the OSI model (e.g., the physical layer), in the negative y-space below the origin 202, and ranging down to a layer one threshold 208-1. The layer one threshold 208-1 may indicate the upper threshold of negative y-space for TTPs associated with layer two of the OSI model (e.g., the datalink layer). Accordingly, the Bloch sphere mapping 200 may map layer two TTPs in the negative y-space from below the layer one threshold 208-1 to a layer two threshold 208-2. Similarly, the Bloch sphere mapping 200 may represent layer three TTPs (e.g., network layer) in the negative y-space below the layer two threshold 208-2 to a layer three threshold 208-3.

In contrast to layers one through three, layers four through seven of the OSI model may be associated with the positive y-space of the Bloch sphere mapping 200. Accordingly, the Bloch sphere mapping 200 may map TTPs associated with layer four of the OSI model (e.g., the transport layer), in the positive y-space above the origin 205, and ranging up to a layer four threshold 208-4. The layer four threshold 208-4 may indicate the lower threshold of positive y-space for TTPs associated with layer five of the OSI model (e.g., the session layer). Accordingly, the Bloch sphere mapping 200 may map: layer five TTPs in the positive y-space from above the layer four threshold 208-4 to a layer five threshold 208-5; layer six TTPs (e.g., the presentation layer) in the positive y-space from above the layer five threshold 208-5 to a layer six threshold 208-6; layer seven TTPs (e.g., the application layer) in the positive y-space from above the layer six threshold 208-6 to a layer seven threshold 208-7. Additionally, the Bloch sphere mapping 200 includes a z-axis orthogonal to the x and y axes, which may be used for further classification of TTPs beyond the respective network and application stack associations with the x and y axes.

As stated previously, the Bloch sphere mapping 200 includes TTP points 206 on the surface 203. In some embodiments of the present disclosure, the TTP points 206 may be color-coded. In other words, the Bloch sphere mapping 200 may include various color mappings around the surface of the sphere, wherein the colors are representative of associated OSI layer(s) and/or the quadrant. For example, TTPs in the application layer of the OSI model, and quadrant I, may be represented with a blue color; TTPs in the hardware layer, and in quadrant II, may be represented with a red color; TTPs in the physical layer and quadrant III may be represented with a purple color, and so on. Additionally, TTPs that fall along the thresholds into multiple layers may be assigned a combination of the associated colors. Using colors in this way may be useful in a polytope visualization 128, where a viewer may more readily identify TTP types. Assigning colors to TTPs may also be useful with respect to quantum-based threat detection, which is based upon light waves.

As shown, the Bloch sphere mapping 200 includes TTP points 206-1 through 206-11 for initial access TTPs. The associated initial access TTPs for TTP points 206 are shown in EXAMPLE TABLE 1:

EXAMPLE TABLE 1

| TTP POINT | TTP | APPLICATION/NETWORK |
| --- | --- | --- |
| 206-1 | DRIVE-BY COMPROMISE | BOTH |
| 206-2 | EXPLOIT PUBLIC FACING APPLICATION | APPLICATION |
| 206-3 | EXTERNAL REMOTE SERVICES | BOTH |
| 206-4 | HARDWARE ADDITIONS | NETWORK |
| 206-5 | REPLICABLE FROM REMOVABLE MEDIA | NETWORK |

EXAMPLE TABLE 1-continued

| TTP POINT | TTP | APPLICATION/NETWORK |
| --- | --- | --- |
| 206-6 | SPEARPHISHING LINK | APPLICATION |
| 206-7 | SPEARPHISHING ATTACHMENT | APPLICATION |
| 206-8 | SPEARPHISHING VIA SERVICE | APPLICATION |
| 206-9 | SUPPLY CHAIN COMPROMISE | NEITHER-INSIDER THREAT |
| 206-10 | TRUSTED RELATIONSHIP | BOTH |
| 206-11 | VALID ACCOUNTS | BOTH |

In EXAMPLE TABLE 1, the TTPs listed indicate the associated TTP point 206 on the Bloch sphere mapping 200. Additionally, the EXAMPLE TABLE 1 includes the associated quadrants with respect to an application or network attack. As shown, the application quadrant TTPs include exploit public facing application, spearphishing link, and spearphishing attachment. The network quadrant TTPs include hardware additions and replicable from removable media. Further, some TTPs use both application and network techniques, specifically, drive-by compromise, external remote services, trusted relationship, valid accounts, and spearphishing via service. However, the supply chain compromise, TTP point 206-9 represents an insider threat. As such, the supply chain compromise belongs to neither of the application and network quadrants. It may be challenging to map insider threats because of the potential randomness of human behavior. Accordingly, in some embodiments of the present disclosure, mapping, such as Bloch sphere mapping 200 may map insider threats relatively close to the origin 203. Positioning insider threat mappings relatively close to the origin 203 because the origin 203 can be used (mathematically speaking) to rotate axes, or to span multiple vectors. Accordingly, by using underlying behavioral modeling, the security threat model 106 may be trained to determine the disposition of insider threat mappings.

Accordingly, in some embodiments of the present disclosure, the TTP prediction manager 126 can generate a polytope visualization 128 (e.g., a Bloch sphere) based on the Bloch sphere mapping 200. Thus, the likelihood of each of the TTPs represented by TTP points 206-1 through 206-11 can be indicated by positioning the respective TTP points 206 on a ray starting from the origin 202 and terminating at the surface of the sphere, wherein the distance along the ray between the origin and the TTP point 226 can be based on the likelihood of the TTP represented. For example, a polytope visualization 128 showing a 50% likelihood of a drive-by compromise, e.g., can include a visualized (e.g., illuminated, colored) point in a sphere, that is positioned half-way along the ray (represented by the TTP point 206-1) between an origin and surface of a visualized Bloch sphere. A lesser or greater likelihood may mean the visualized point is closer to the origin, or closer to the surface, respectively. In some embodiments of the present disclosure, the TTP prediction manager 126 can use a quantum computing approach to convert the TTP points 206 to a quantum friendly format, and assign a series of vector space points in radians between 0 and 1.

Figure 3:
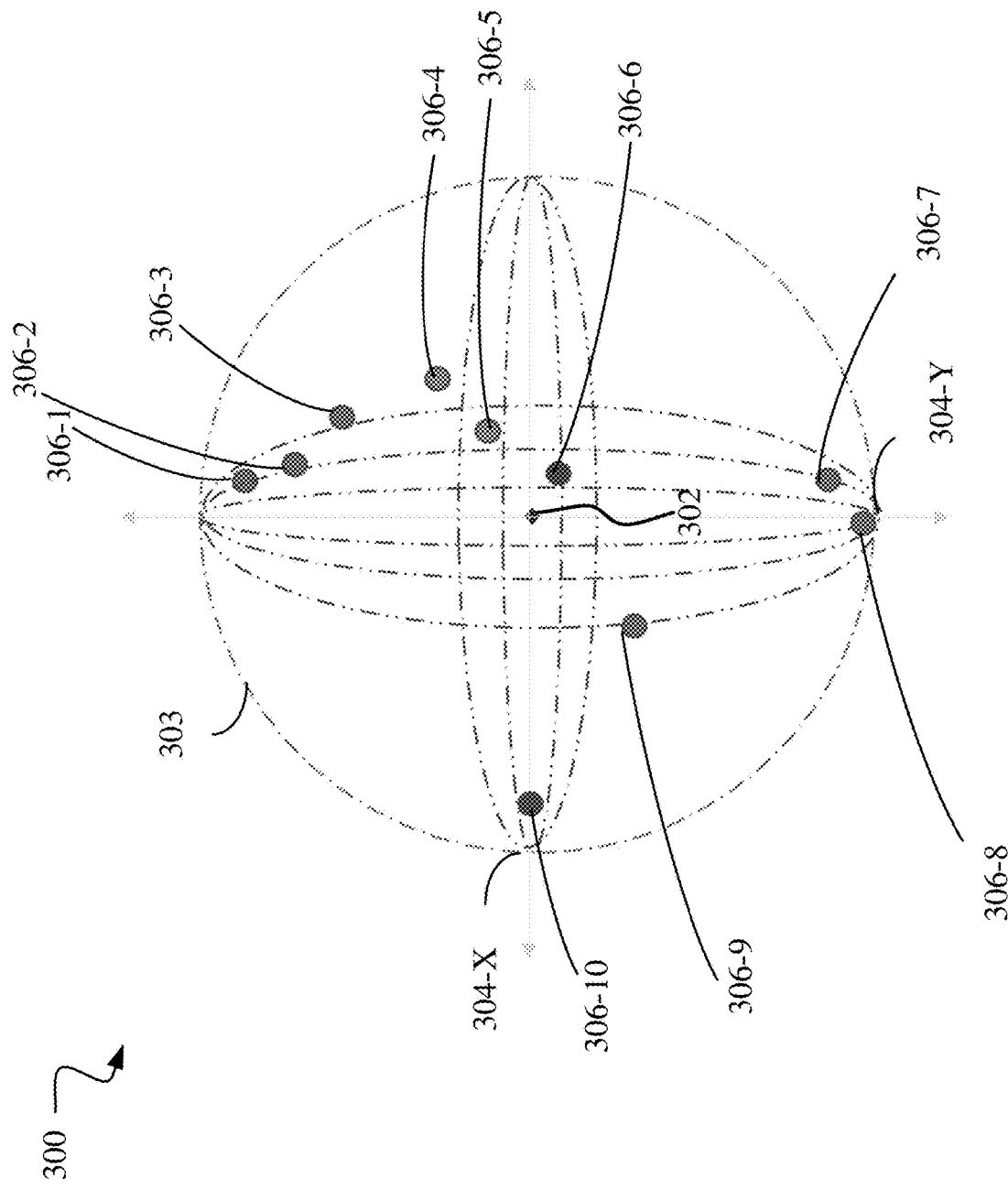
FIG. 3 is a diagram of an example Bloch sphere, in accordance with some embodiments of the present disclosure.

FIG. 3 is a diagram of an example Bloch sphere mapping 300 for an execution TTP, in accordance with some embodiments of the present disclosure. Similar to example Bloch sphere mapping 200, the example Bloch sphere mapping 300 includes an origin 302, surface 303, axis 304-X, axis 304-Y, and TTP points 306-1 through 306-10 (collectively, TTP points 306). However, in contrast to the example Bloch sphere mapping 200 (which maps initial access TTPs), the example Bloch sphere mapping 300 maps execution TTPs. The associated execution TTPs for TTP points 306 are shown in EXAMPLE TABLE 2:

EXAMPLE TABLE 2

| TTP POINT | TTP | APPLICATION/NETWORK |
|---|---|---|
| 306-1 | APPLE SCRIPT | APPLICATION |
| 306-2 | CMSTP | APPLICATION |
| 306-3 | COMMAND-LINE INTERFACE | BOTH |
| 306-4 | COMPILE HTML FILE | APPLICATION |
| 306-5 | COMPONENT OBJECT MODEL AND DISTRIBUTED COM | APPLICATION |
| 306-6 | CONTROL PANEL ITEMS | APPLICATION |
| 306-7 | DYNAMIC DATA EXCHANGE | NETWORK |
| 306-8 | EXECUTION THROUGH MODULE LOAD | APPLICATION |
| 306-9 | EXPLOITATION FOR CLIENT EXECUTION | BOTH |
| 306-10 | GRAPHICAL USER INTERFACE (B10) | BOTH |

In EXAMPLE TABLE 2, the TTPs listed indicate the associated TTP point 306 on the Bloch sphere mapping 300. Additionally, the EXAMPLE TABLE 2 includes the associated quadrants with respect to an application or network attack. As shown, the application quadrant TTPs include Apple® script, Microsoft® connection manager profile installer (CMSTP), compile hypertext markup language (HTML) file, component object model and distributed com, control panel items, and execution through module load. The network quadrant TTPs include dynamic data exchange. Further, the TTPs that use both application and network techniques include command-line interface, exploitation for client execution, and graphical user interface.

Accordingly, some embodiments of the present disclosure can use mappings for each type, or category of TTP, from initial access through exfiltration and impact of the frameworks to newer types of TTPs, such as MalGANs and yet undiscovered TTP types. For example, the the security threat model 106 may learn about new types of TTPs and incorporate the newly discovered types into the Bloch sphere mapping.

Figure 4:
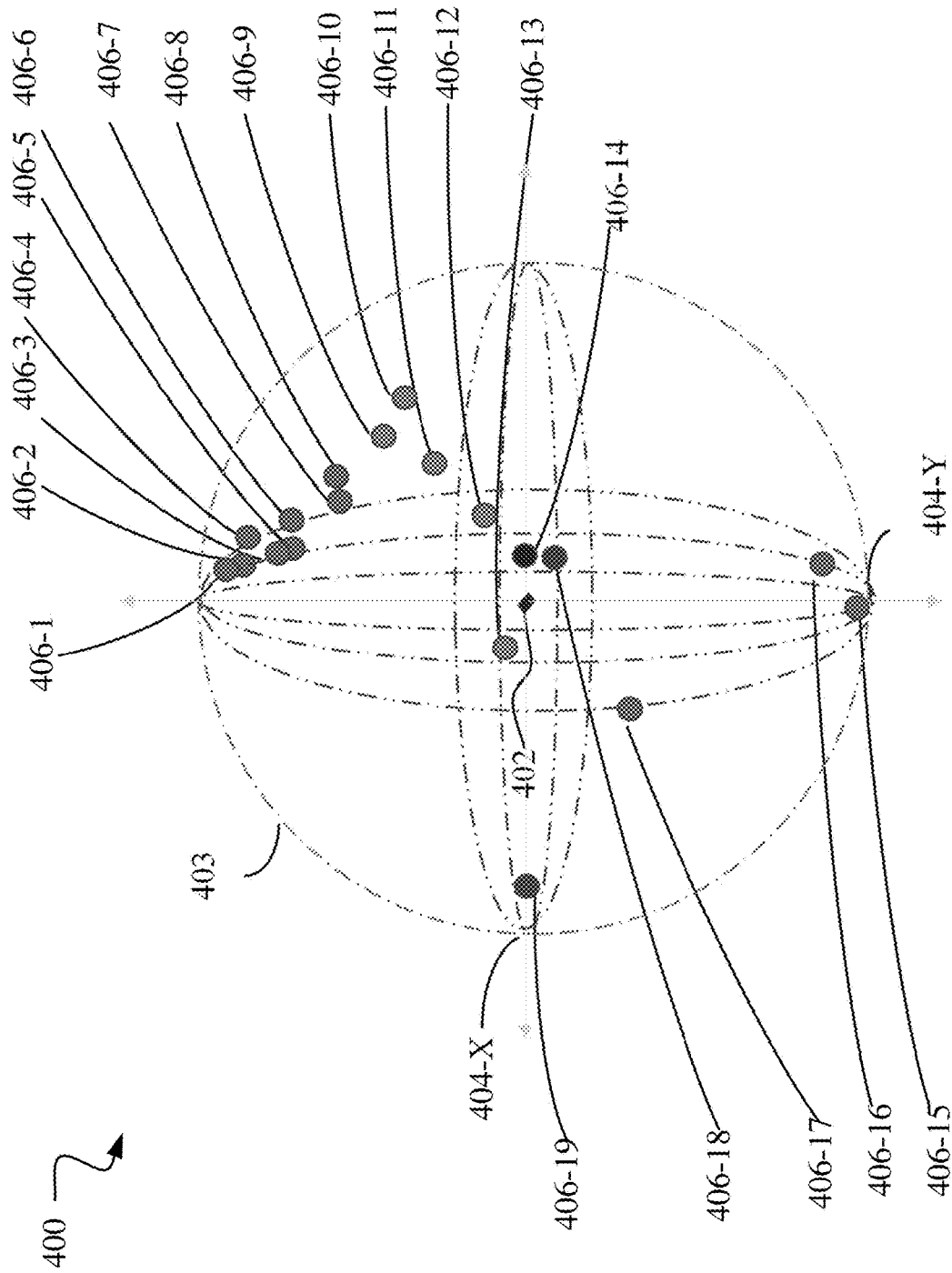
FIG. 4 is a diagram of an example Bloch sphere, in accordance with some embodiments of the present disclosure.

FIG. 4 is a diagram of an example Bloch sphere mapping 400, in accordance with some embodiments of the present disclosure. Similar to example Bloch sphere mapping 200, the example Bloch sphere mapping 400 includes an origin 402, surface 403, axis 404-X, axis 404-Y, and TTP points 406-1 through 406-21 (collectively, TTP points 406).

With machine learning, it may be possible to determine TTP mappings that are specific to certain industries. For example, the QSP matrix 118 may indicate that industries using high-tech automation are more vulnerable to application hacks. Additionally, the QSP matrix 118 may indicate that relatively older industries are more vulnerable to insider threats. Further, in some embodiments of the present disclosure, TTP mappings can be unique to different adversarial groups such as APT10, Lazarus, and the like.

The Bloch sphere mapping 400 may represent the mapping of initial access TTPs for a specific industry. Given enough historical data (e.g., for the security domain 104), it may be possible to generate the Bloch sphere mapping for specific industries. Thus, in contrast to Bloch sphere mapping 200, which may map initial access TTPs for any industry, the Bloch sphere mapping 400 may map initial access TTPs for the oil and gas industry.

As stated previously, the Bloch sphere mapping 400 includes TTP points 406 on the surface 403. More specifically, the Bloch sphere mapping 400 includes TTP points 406-1 through 406-19 for initial access TTPs. The associated initial access TTPs for TTP points 406 are shown in EXAMPLE TABLE 3:

EXAMPLE TABLE 3

| TTP POINT | TTP | APPLICATION/NETWORK |
|---|---|---|
| 406-1 | DRIVE-BY COMPROMISE | BOTH |
| 406-2 | EXPLOIT PUBLIC FACING APPLICATION | APPLICATION |
| 406-3 | EXTERNAL REMOTE SERVICES | BOTH |
| 406-4 | HARDWARE ADDITIONS | NETWORK |
| 406-5 | REPLICABLE FROM REMOVABLE MEDIA | NETWORK |
| 406-6 | PHISHING | APPLICATION |
| 406-7 | SPEARPHISHING LINK | APPLICATION |
| 406-8 | SPEARPHISHING ATTACHMENT | APPLICATION |
| 406-9 | SPEARPHISHING VIA SERVICE | APPLICATION |
| 406-10 | SUPPLY CHAIN COMPROMISE | NEITHER-INSIDER THREAT |
| 406-11 | COMPROMISE SOFTWARE SUPPLY CHAIN | NEITHER-INSIDER THREAT |
| 406-12 | COMPROMISE HARDWARE SUPPLY CHAIN | NEITHER-INSIDER THREAT |
| 406-13 | TRUSTED RELATIONSHIP | BOTH |
| 406-14 | VALID ACCOUNTS | APPLICATION |
| 406-15 | DEFAULT ACCOUNTS | APPLICATION |
| 406-16 | DOMAIN ACCOUNTS | BOTH |
| 406-17 | LOCAL ACCOUNTS | NEITHER-INSIDER THREAT |
| 406-18 | CLOUD ACCOUNTS | BOTH |
| 406-19 | COMPROMISE SOFTWARE DEPNDENCIES | BOTH |

In EXAMPLE TABLE 3, the TTPs listed indicate the associated TTP point 406 on the Bloch sphere mapping 400. Additionally, the EXAMPLE TABLE 3 includes the associated quadrants with respect to an application or network attack. As shown, the application quadrant TTPs include exploit public facing application, spearphishing link, and spearphishing attachment. The network quadrant TTPs include hardware additions and replicable from removable media. Further, some TTPs use both application and network techniques, specifically, drive-by compromise, external remote services, trusted relationship, valid accounts, and spearphishing via service. However, the supply chain compromise, TTP point 406-9 represents an insider threat. As such, the supply chain compromise belongs to neither of the application and network quadrants.

Figure 5:
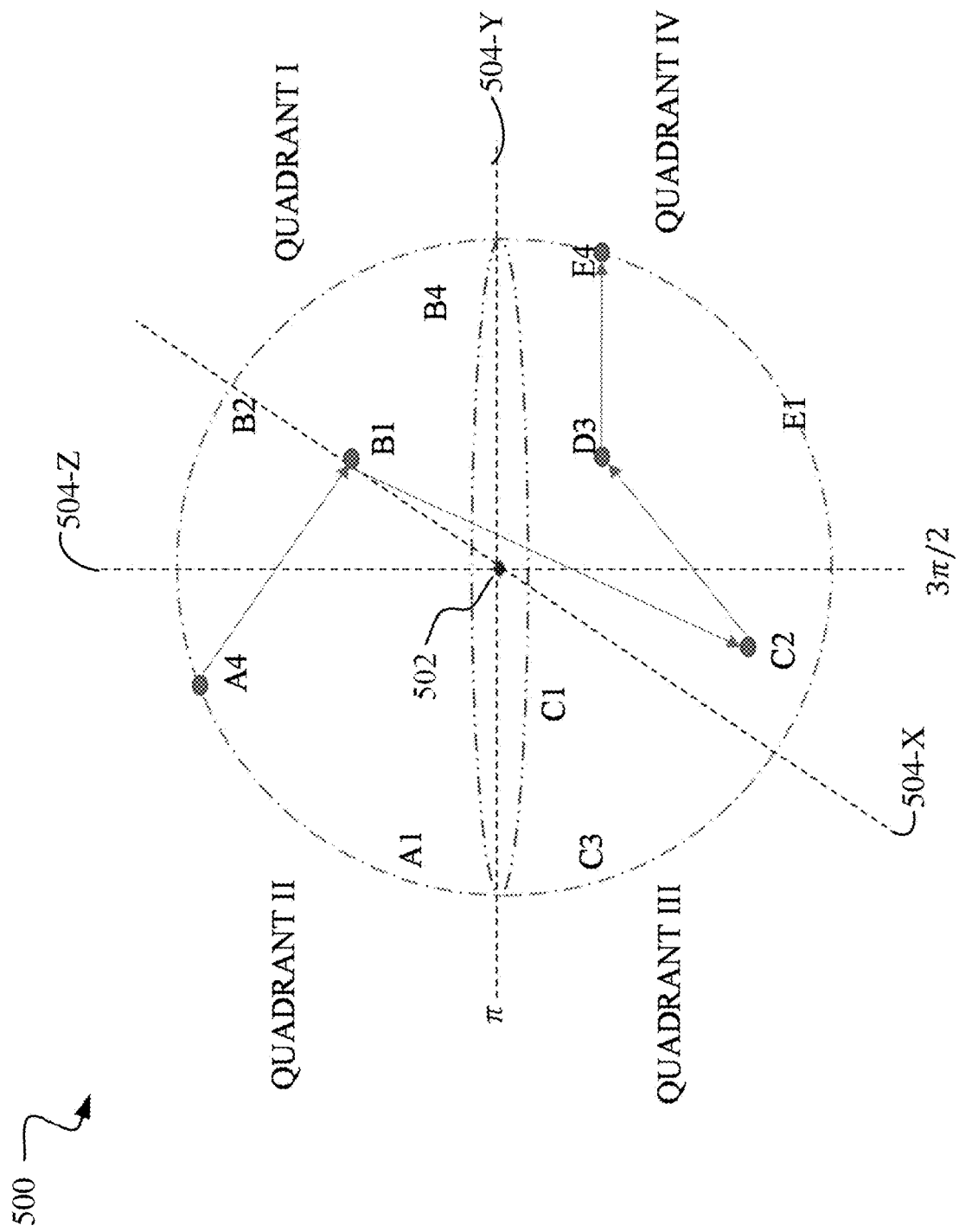
FIG. 5 is a diagram of an example polytope visualization, in accordance with some embodiments of the present disclosure.

FIG. 5 is a diagram of an example polytope visualization 500, in accordance with some embodiments of the present disclosure. In addition to generating polytope visualizations of a single TTP type, the TTP prediction manager 126 can combine the relatively more likely TTPs from multiple TTP types into a single polytope visualization to show a likely attack pattern against a security domain. The example polytope visualization 500 in this example is a Bloch sphere having an origin 502, surface 503, axis 504-X, axis 504-Y, axis 504-Z, and TTP points A4, B1, C2, D3, and E4. The example polytope visualization 500 may represent the likelihoods of a sequence of TTPs, from Initial Access TTP (e.g., A4), to Persistence TTP (e.g., B1), to Execution TTP (e.g., C2), to Discovery TTP (e.g., D3), to Collection TTP (e.g., E4). The associated TTPs for TTP points 506 are shown in EXAMPLE TABLE 5:

EXAMPLE TABLE 5

| TTP POINT | TTP | APPLICATION/NETWORK |
|---|---|---|
| A4 | APPLE SCRIPT | APPLICATION |
| B1 | CMSTP | APPLICATION |
| C2 | COMMAND-LINE INTERFACE | BOTH |
| D3 | COMPILE HTML FILE | APPLICATION |
| E4 | COMPONENT OBJECT MODEL AND DISTRIBUTED COM | APPLICATION |

The example polytope visualization 500 may be based on the EXAMPLE QSP MATRICES 1 and 2. Accordingly, in EXAMPLE TABLE 5, the TTPs listed indicate the associated TTP points on the Bloch sphere. Additionally, the EXAMPLE TABLE 4 includes the associated quadrants with respect to an application or network attack. As shown, the application quadrant TTPs include Apple® script, Microsoft® connection manager profile installer (CMSTP), compile hypertext markup language (HTML) file, component object model and distributed com, control panel items, and execution through module load. The network quadrant TTPs include dynamic data exchange. Further, the TTPs that use both application and network techniques include command-line interface, exploitation for client execution, and graphical user interface.

Further, the TTP points have rays pointing an execution path of an attack pattern. In this way, the TTP prediction manager 126 may combine visualizations of different TTP types to provide a representation of likely attack paths on the security domain 104.

Figure 6:
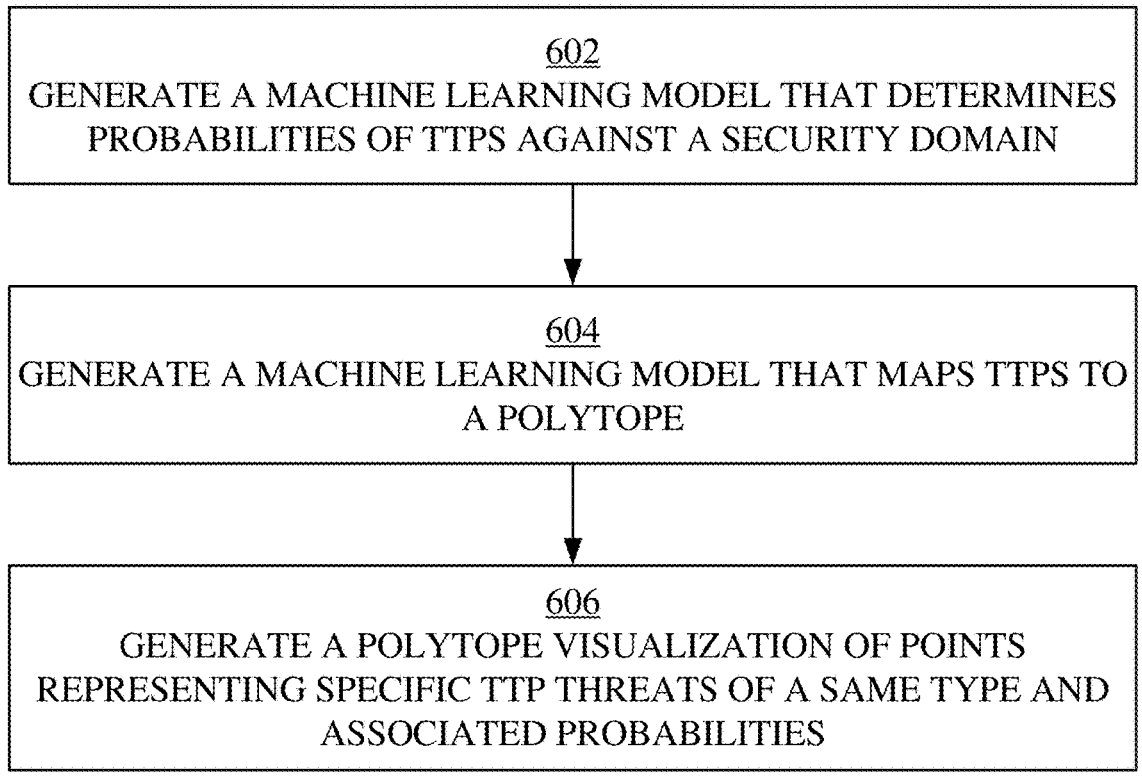
FIG. 6 is a process flow chart of a method for a quantum computing machine learning model, in accordance with some embodiments of the present disclosure.

FIG. 6 is a process flow chart of a method 600 for a quantum computing machine learning model, in accordance with some embodiments of the present disclosure. A QSP calculator and security threat model (such as, the QSP calculator 120 and security threat model 106) can perform the method 600.

At operation 602, the security threat model 106 can generate a machine learning model that determines the probabilities of TTP threats. Determining the probabilities of TTP threats can involve training a machine learning model based on the networked systems 114 and SIEM platform 116 of the security domain 104. Additionally, the training can include the STIX-TAXII data 110.

At operation 604, the TTP mapping model 109 can generate a machine learning model that maps TTPs to a polytope. More specifically, the TTP mapping model 109 can map a group of specific TTPs of a same tape to a polytope, such as a Bloch sphere. Additionally, the TTP mapping model 109 can map a specific TTP to a vector direction from a center of the polytope. The TTPs may include known TTPs, such as those in the MITRE ATT&CK framework. Additionally, the TTPs may include unknown and evolving newer TTPs, including game theory, MalGAN, and quantum computing based TTPs.

At operation 606, the TTP prediction manager 126 can generate a polytope visualization of points representing specific TTPs of a same type and associated probabilities. In the polytope visualization, a disposition of each of the visualized points in multidimensional space is based on a vector direction from an origin of the polytope and a distance from the center. Further, the vector direction can represent a specific TTP, and the distance can represent the probability of a malicious actor attempting the TTP. For example, the TTP prediction manager 126 can generate a 3D Bloch sphere having points in 3D space, where the disposition represents a specific TTP and the corresponding likelihood of its occurrence. In some embodiments of the present disclosure, the disposition of each of the visualized points is based on a vector direction from an origin of the Bloch sphere. Additionally, the vector direction can indicate one of the specific TTP threats. Further, a distance of the visualized points from the origin can indicate the corresponding probability. For example, as the probability ranges from zero to one, a TTP of relatively lower probability may be disposed near the origin of the Bloch sphere. Thus, as the probability increases, the distance from the origin may increase. Accordingly, a TTP threat with 100% probability may be visualized with a point on the surface of the Bloch sphere.

Figure 7:
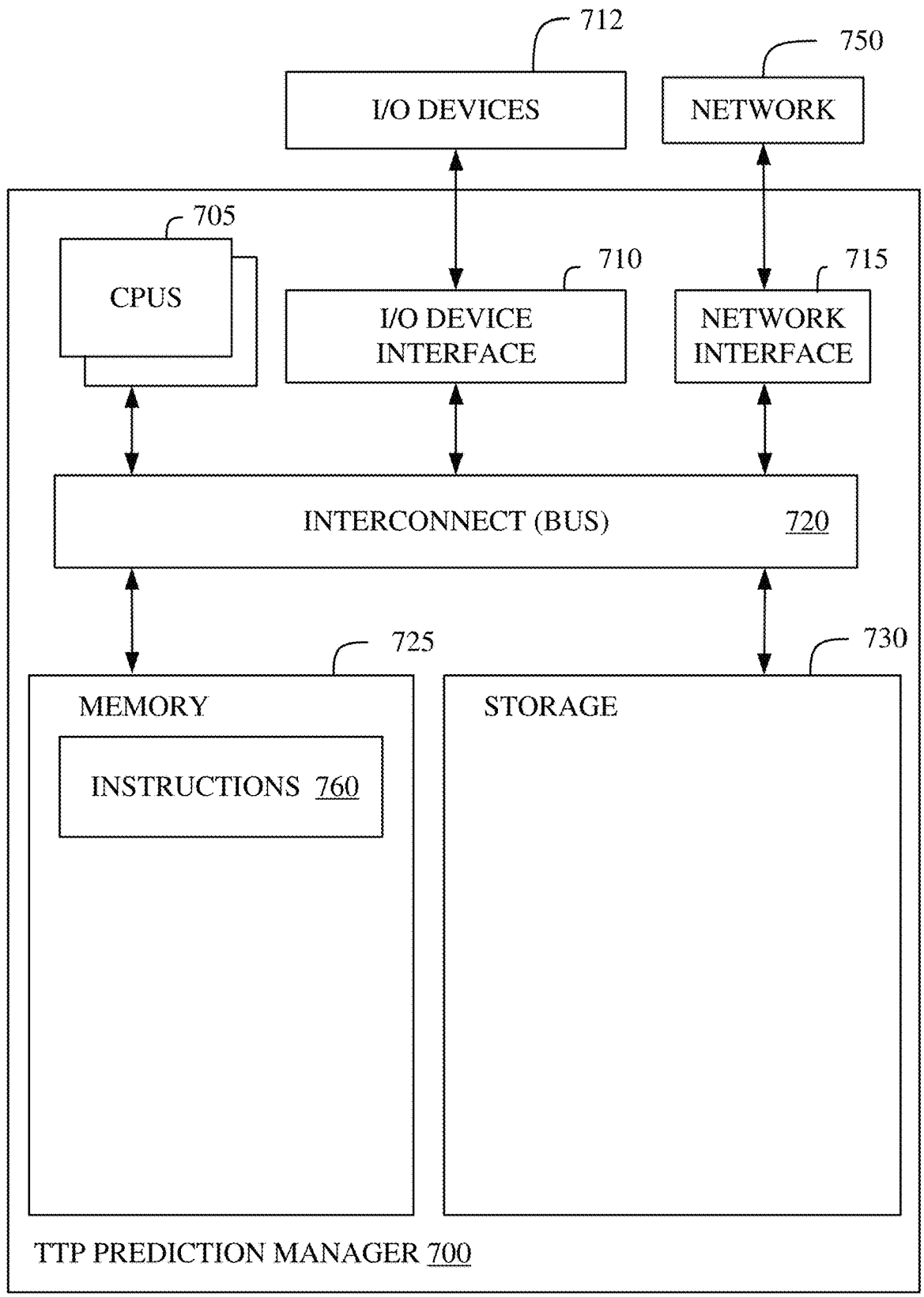
FIG. 7 is a block diagram of an example TTP prediction manager, in accordance with some embodiments of the present disclosure.

FIG. 7 is a block diagram of an example TTP prediction manager 700, in accordance with some embodiments of the present disclosure. In various embodiments, the 700 is similar to the TTP prediction manager 126 and can perform the method described in FIG. 6 and/or the functionality discussed in FIGS. 1-5. In some embodiments, the TTP prediction manager 700 provides instructions for the aforementioned methods and/or functionalities to a client machine such that the client machine executes the method, or a portion of the method, based on the instructions provided by the TTP prediction manager 700. In some embodiments, the TTP prediction manager 700 comprises software executing on hardware incorporated into a plurality of devices.

The TTP prediction manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (POP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, and/or flash memory devices. Additionally, the storage 730 can include storage area-network (SAN) devices, the cloud, or other devices connected to the TTP prediction manager 700 via the I/O device interface 710 or to a network 750 via the network interface 715.

In some embodiments, the memory 725 stores instructions 760. However, in various embodiments, the instructions 760 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all of the method described in FIG. 6 and/or the functionality discussed in FIGS. 1-5.

In various embodiments, the I/O devices 712 include an interface capable of presenting information and receiving input. For example, I/O devices 712 can present information to a listener interacting with TTP prediction manager 700 and receive input from the listener.

The TTP prediction manager 700 is connected to the network 750 via the network interface 715. Network 750 can comprise a physical, wireless, cellular, or different network.

In some embodiments, the TTP prediction manager 700 can be a multi-user mainframe computer system, a single-user system, or a server computer or similar device that has little or no direct user interface but receives requests from other computer systems (clients). Further, in some embodiments, the TTP prediction manager 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary TTP prediction manager 700. In some embodiments, however, individual components can have greater or lesser complexity than as represented in FIG. 7, components other than or in addition to those shown in FIG. 7 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
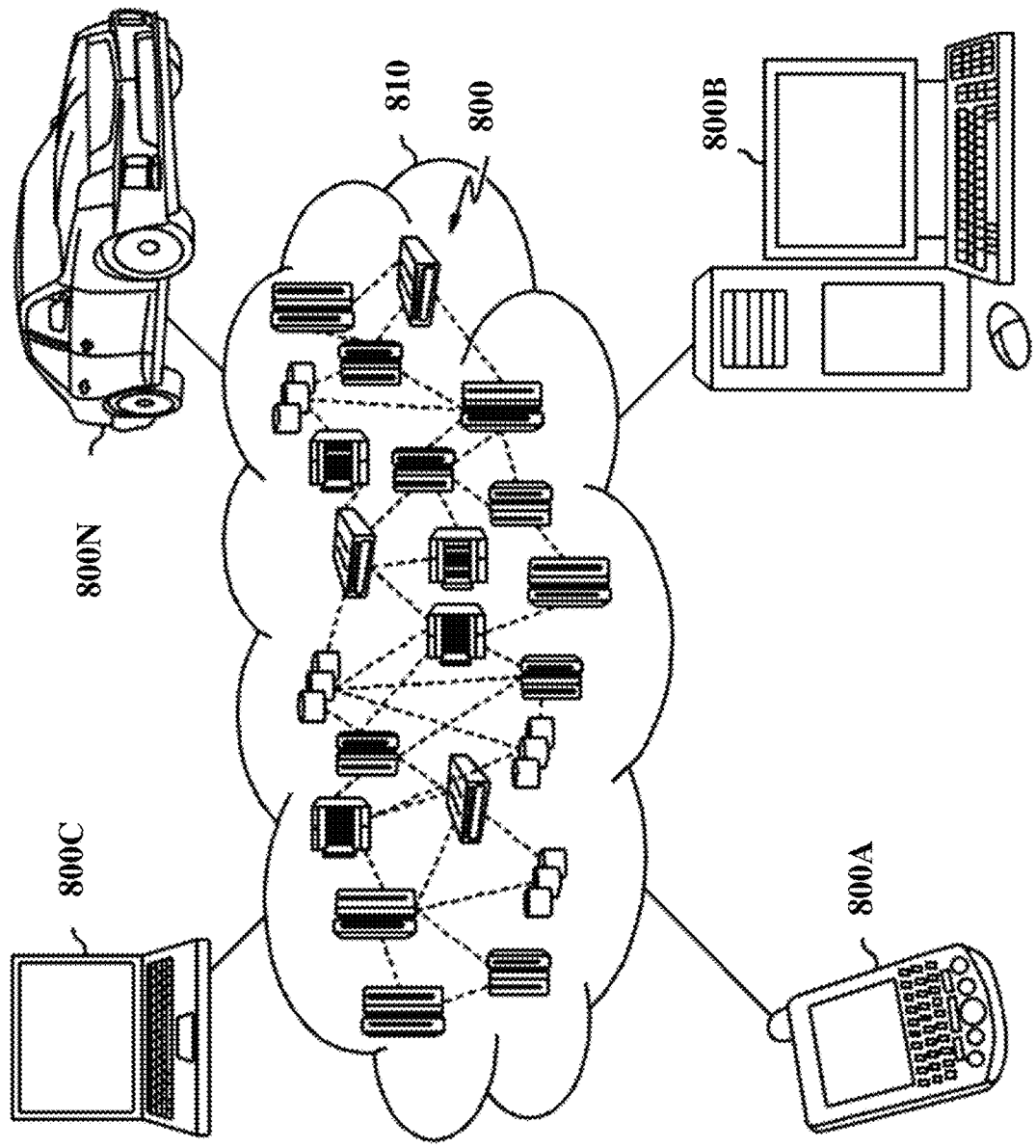
FIG. 8 is a cloud computing environment, according to some embodiments of the present disclosure.

FIG. 8 is a cloud computing environment 810, according to some embodiments of the present disclosure. As shown, cloud computing environment 810 includes one or more cloud computing nodes 800. The cloud computing nodes 800 can perform the method described in FIG. 6 and/or the functionality discussed in FIGS. 1-5. Additionally, cloud computing nodes 800 can communicate with local computing devices used by cloud consumers, such as, for example, personal digital assistant (PDA) or cellular telephone 800A, desktop computer 800B, laptop computer 800C, and/or automobile computer system 800N. Further, the cloud computing nodes 800 can communicate with one another. The cloud computing nodes 800 can also be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
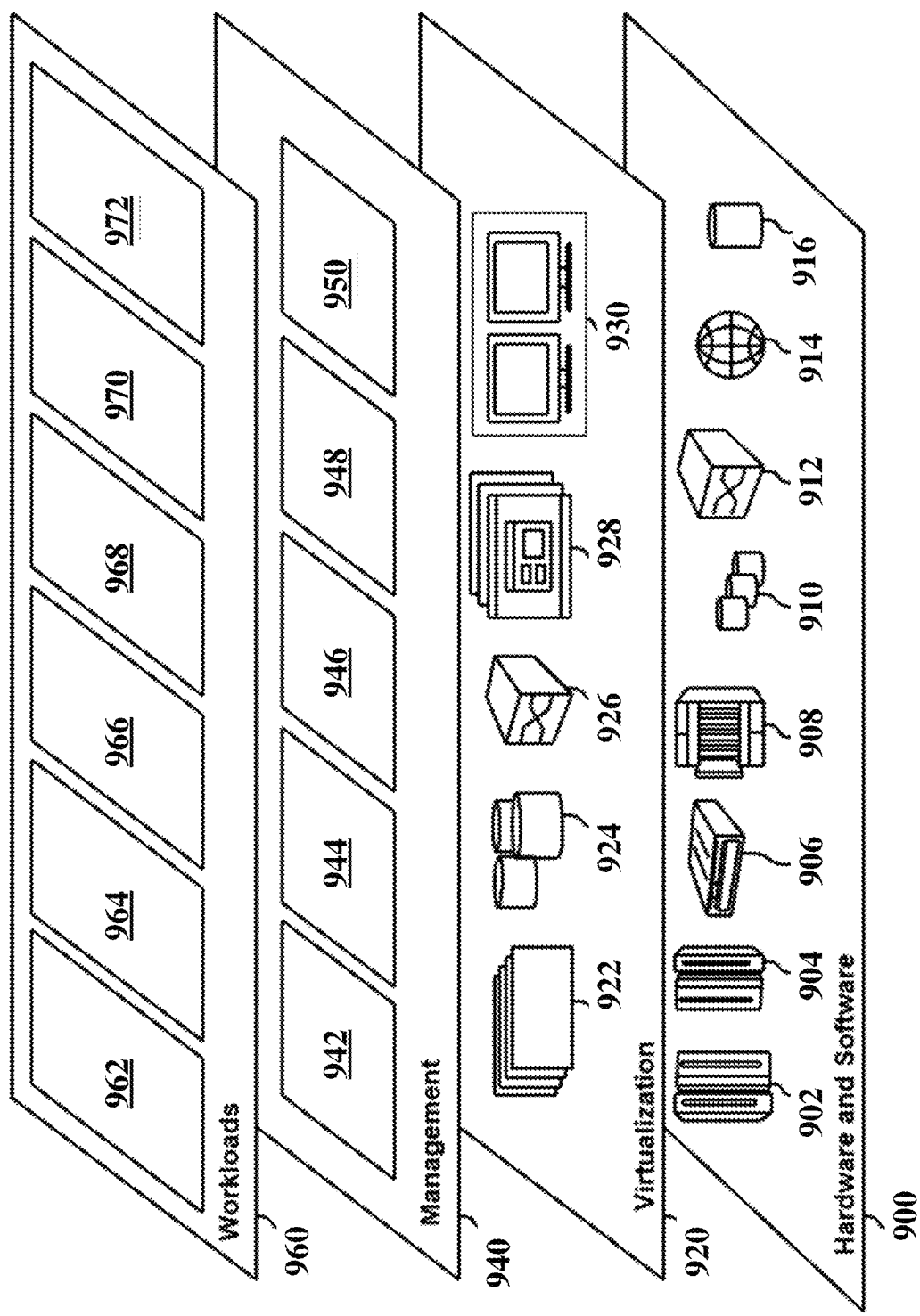
FIG. 9 is a set of functional abstraction model layers provided by cloud computing environment, according to some embodiments of the present disclosure.

FIG. 9 is a set of functional abstraction model layers provided by cloud computing environment 810 (FIG. 8), according to some embodiments of the present disclosure. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. Metering and Pricing 944 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service level management 948 can allocate suitable processing power and memory to process static sensor data. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; software development and lifecycle management 964; virtual classroom education delivery 966; data analytics processing 968; transaction processing 970; and TTP prediction manager 972.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, vector, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a security model, comprising:
generating a machine learning model that determines probabilities of a plurality of specific techniques, types, and procedures (TTPs) against a security domain;
generating a machine learning model that maps a plurality of TTPs to a Bloch sphere for the security domain; and
generating a polytope visualization comprising a Bloch sphere, wherein the Bloch sphere comprises a plurality of visualized points in three-dimensional (3D) space, wherein the plurality of visualized points represent a corresponding plurality of specific TTPs of a same type and a plurality of associated probabilities, wherein a disposition of each of the plurality of visualized points of the polytope visualization is based on the determined probabilities and the mapped plurality of TTPs.

2. The method of claim 1, wherein the mapped plurality of TTPs map a vector direction to one TTP of the plurality of specific TTPs.

3. The method of claim 2, wherein the disposition comprises a point in 3D space that follows the vector direction from a center of the Bloch sphere for a distance equal to a value that is proportional to one of the plurality of associated probabilities that is associated with the one TTP.

4. The method of claim 1, wherein the plurality of specific TTPs comprise a TTP selected from a group consisting of:
a game theory attack associated with three or more malicious actors;
a malicious actor comprising an artificially intelligent adversary, wherein the artificially intelligent adversary comprises a generative adversarial network (MalGAN); and
one or more quantum-computing attack strategies.

5. The method of claim 1, wherein the 3D disposition of each of the plurality of visualized points is based on an association of the one TTPs with a layer of an open systems interconnection (OSI) model, wherein a layer three of the OSI model is associated with a first range of positive y values of a corresponding plurality of 3D coordinates to the plurality of visualized points, wherein the first range of positive y values ranges up to a first positive threshold, and wherein layers four through seven of the OSI model are associated with corresponding ranges of positive y values that are increasing in correlation with a number value of the layers four through seven of the OSI model.

6. The method of claim 1, wherein the 3D disposition of each of the plurality of visualized points is based on an association of the one TTP with a layer of an open systems interconnection (OSI) model, wherein a layer zero of the OSI model is associated with a first range of negative y values of a corresponding plurality of 3D coordinates to the plurality of visualized points, wherein the first range of negative y values ranges down to a first negative threshold, and wherein layers one and two of the OSI model are associated with corresponding ranges of negative y values that are decreasing in reverse correlation with a number value of the layers one and two of the OSI model.

7. A computer program product comprising program instructions stored on a computer readable storage medium, the program instructions executable by a processor to cause the processor to perform a method comprising:
generating a machine learning model that determines probabilities of a plurality of specific techniques, types, and procedures (TTPs) against a security domain;

generating a machine learning model that maps a plurality of TTPs to a Bloch sphere for the security domain; and generating a polytope visualization comprising a Bloch sphere, wherein the Bloch sphere comprises a plurality of visualized points in three-dimensional (3D) space, wherein the plurality of visualized points represent a corresponding plurality of specific TTPs of a same type and a plurality of associated probabilities, wherein a disposition of each of the plurality of visualized points of the polytope visualization is based on the determined probabilities and the mapped plurality of TTPs.

8. The computer program product of claim 7, wherein the mapped plurality of TTPs map a vector direction to one TTP of the plurality of specific TTPs.

9. The computer program product of claim 8, wherein the disposition comprises a point in 3D space that follows the vector direction from a center of the Bloch sphere for a distance equal to a value that is proportional to one of the plurality of associated probabilities that is associated with the one TTP.

10. A system comprising:

a computer processing circuit; and a computer-readable storage medium storing instructions, which, when executed by the computer processing circuit, are configured to cause the computer processing circuit to perform a method comprising:

generating a machine learning model that determines probabilities of a plurality of specific techniques, tactics, and procedures (TTPs) against a security domain;

generating a machine learning model that maps a plurality of TTPs to a polytope for the security domain; and generating a polytope visualization comprising a plurality of visualized points in a multi-dimensional space, wherein the plurality of visualized points represent a corresponding plurality of specific TTPs of a same type and a plurality of associated probabilities, wherein a disposition of each of the plurality of visualized points of the polytope visualization is based on the determined probabilities and the mapped plurality of TTPs.

11. The system of claim 10, wherein the mapped plurality of TTPs map a vector direction to one TTP of the plurality of specific TTPs.

12. The system of claim 11, wherein the disposition comprises a point in multi-dimensional space that follows the vector direction from a center of the polytope for a distance equal to a value that is proportional to one of the plurality of associated probabilities that is associated with the one TTP.

13. The system of claim 10, wherein the polytope visualization comprises a Bloch sphere.

14. The system of claim 10, wherein the plurality of specific TTPs comprise a game theory attack associated with three or more malicious actors.

15. The system of claim 10, wherein the plurality of specific TTPs comprise a TTP from a malicious actor comprising an artificially intelligent adversary.

16. The system of claim 15, wherein the artificially intelligent adversary comprises a generative adversarial network (MalGAN).

17. The system of claim 10, wherein the plurality of specific TTPs comprises one or more quantum-computing attack strategies.

18. The system of claim 10, wherein the disposition of each of the plurality of visualized points is based on an association of the one of the plurality of specific TTPs with a layer of an open systems interconnection (OSI) model.

19. The system of claim 18, wherein a layer three of the OSI model is associated with a first range of positive y values of a corresponding plurality of 3D coordinates to the plurality of visualized points, wherein the first range of positive y values ranges up to a first positive threshold, and wherein layers four through seven of the OSI model are associated with corresponding ranges of positive y values that are increasing in correlation with a number value of the layers four through seven of the OSI model.

20. The system of claim 18, wherein a layer zero of the OSI model is associated with a first range of negative y values of a corresponding plurality of 3D coordinates to the plurality of visualized points, wherein the first range of negative y values ranges down to a first negative threshold, and wherein layers one and two of the OSI model are associated with corresponding ranges of negative y values that are decreasing in reverse correlation with a number value of the layers one and two of the OSI model.

* * * * *